United States Patent
Wheater et al.

(10) Patent No.: US 8,540,211 B2
(45) Date of Patent: Sep. 24, 2013

(54) AUTOMATED VALVE TESTING APPARATUS

(75) Inventors: Christopher John Wheater, York (GB); David Horsfield, Dorset (GB)

(73) Assignee: Norgren Limited, Staffordshire (GB)

( * ) Notice: Subject to any disclaimer, the term of this patent is extended or adjusted under 35 U.S.C. 154(b) by 296 days.

(21) Appl. No.: 13/002,811

(22) PCT Filed: Jul. 25, 2008

(86) PCT No.: PCT/GB2008/002555
§ 371 (c)(1),
(2), (4) Date: Jan. 6, 2011

(87) PCT Pub. No.: WO2010/010315
PCT Pub. Date: Jan. 28, 2010

(65) Prior Publication Data
US 2011/0114191 A1 May 19, 2011

(51) Int. Cl.
*F16K 31/124* (2006.01)

(52) U.S. Cl.
USPC ......... 251/129.04; 73/1.68; 73/1.71; 73/1.72; 73/168; 702/114

(58) Field of Classification Search
USPC .................. 251/129.04; 73/1.68, 1.71, 1.72, 73/168; 702/114
See application file for complete search history.

(56) References Cited

U.S. PATENT DOCUMENTS

| | | | | |
|---|---|---|---|---|
| 5,499,527 A * | 3/1996 | Kuehn et al. | | 73/1.59 |
| 6,089,269 A * | 7/2000 | Essam | | 137/624.15 |
| 6,176,247 B1 * | 1/2001 | Winchcomb et al. | | 137/14 |
| 6,186,167 B1 * | 2/2001 | Grumstrup et al. | | 137/487.5 |
| 6,435,022 B1 * | 8/2002 | Albuaijan | | 73/168 |
| 6,920,409 B2 * | 7/2005 | Essam | | 702/114 |
| 7,131,324 B2 * | 11/2006 | Brown | | 73/168 |
| 7,556,238 B2 * | 7/2009 | Seberger | | 251/69 |
| 8,074,512 B2 * | 12/2011 | Al-Buaijan | | 73/168 |
| 2004/0093173 A1 * | 5/2004 | Essam | | 702/51 |
| 2005/0189017 A1 * | 9/2005 | Eryurek | | 137/487.5 |
| 2006/0191314 A1 * | 8/2006 | Karte | | 73/1.72 |
| 2007/0018127 A1 * | 1/2007 | Seberger | | 251/129.04 |
| 2010/0282990 A1 * | 11/2010 | Heer | | 251/129.15 |

FOREIGN PATENT DOCUMENTS

| | | |
|---|---|---|
| GB | 2338051 A | 12/1999 |
| GB | 2372087 A | 8/2002 |
| WO | WO 0159346 A1 * | 8/2001 |
| WO | 02082193 A2 | 10/2002 |

* cited by examiner

*Primary Examiner* — John Rivell
*Assistant Examiner* — Minh Le
(74) *Attorney, Agent, or Firm* — The Ollila Law Group LLC (57) ABSTRACT

A method for partially stroking an emergency valve apparatus is provided. The emergency valve apparatus comprises an actuator (103) and a valve member (101). The apparatus is movable between a first position and a second position. The method comprises the step of initiating a partial stroke movement of the apparatus from the first position towards the second position. A parameter of the fluid acting on the apparatus is measured. Once the measured parameter reaches a threshold value, the partial stroke movement is reversed.

34 Claims, 4 Drawing Sheets

AUTOMATED VALVE TESTING APPARATUS

FIELD OF THE INVENTION

The present invention relates to means for the automated testing of the operational status of valves without fully opening or closing them, thus minimizing disturbance of the fluid or process that they control.

BACKGROUND OF THE INVENTION

1. Field of the Invention

This invention relates in general to any application of fluid control valves where high reliability of operation is essential. Such applications exist in a number of industries. In particular this invention relates to emergency shut down systems used, for example, in the processing industries. Typically oil and gas plants will have pneumatically controlled emergency valves within their systems. In the event of a potential hazard the emergency valves will operate to either close thus isolating the plant, or open thus providing a bypass to controlled fluids. In many instances, these emergency valves may remain in their operational position for a period of months or even years. Therefore a frequent problem with such valves is that they may fail to operate correctly in the event of an emergency because components have become seized or slow to response. This problem may lead to a hazardous situation. This invention relates to the automated testing of such valves with minimum impact on the normal operation of the plant to gain increased confidence that in the event of a potential hazard the valve will operate as intended.

2. Description of the Related Art

A number of products exist within the market that provide automated testing of valves, including emergency valves. Many of these are based on initiating the sequence to be adopted during a hazardous situation for a period of time that is long enough to determine that the valve is not seized and is free to operate correctly, but of a short enough period so that the valve does not fully operate and disturb the controlled process. Such automated test mechanisms are termed partial stroke testing within the field.

U.S. Pat. No. 6,089,269 teaches partially stroking an emergency valve based on a predetermined voltage off period. The '269 patent teaches initially turning the timers to a minimum and gradually increasing the voltage off period in order to avoid overshooting the desired valve position.

U.S. Pat. No. 6,920,409 describes a method of partial stroke testing based on a predetermined time interval. The method then compares data gathered from previous successful operations of the valve with data gathered during an automated test. Should the data differ between the initial test and the subsequent test in key aspects, the potential for failure of the valve would be identified.

The present invention describes a method for the detection of potential valve failure without the need for initial testing or initial test data.

ASPECTS OF THE INVENTION

The main objective of my invention is to provide a device to facilitate partial stroke testing of valves without reliance on previous testing of the valve.

According to an aspect of the invention, a method for partially stroking an emergency valve apparatus comprising an actuator and a valve member, the apparatus being movable between a first position and a second position, comprises the steps of:

initiating partial stroke movement of the apparatus from the first position towards the second position;

measuring a parameter of a fluid acting on the apparatus; and reversing the partial stroke movement of the apparatus when the measured parameter of the fluid reaches a threshold value.

Preferably, the measured parameter comprises a fluid pressure.

Preferably, the method further comprises the step of comparing the measured pressure to a mathematical model to determine an operational status of the emergency valve.

Preferably, the threshold pressure comprises a pressure above atmospheric pressure.

Preferably, the measured parameter comprises a flow rate of the fluid exhausted from the apparatus.

Preferably, the measured parameter comprises a flow rate of the fluid provided to the apparatus.

Preferably, the method further comprises partially stroking the emergency valve in an iterative manner, wherein each of the partial strokes comprises a different measured fluid parameter threshold value.

According to another aspect of the invention, a method for partially stroking an emergency valve apparatus comprising an actuator and a valve member, the apparatus being movable between a first position and a second position, comprises the steps of:

initiating partial stroke movement of the apparatus from the first position towards the second position by adjusting an energy supplied to the apparatus;

measuring the energy acting on the apparatus; and reversing the partial stroke movement of the apparatus and the valve when the measured energy reaches a threshold level.

Preferably, the step of measuring the energy acting on the apparatus comprises measuring a current.

Preferably, the step of measuring the energy acting on the apparatus comprises measuring a voltage.

Preferably, the method further comprises the step of measuring a pressure of a fluid acting on the apparatus.

Preferably, the method further comprises the step of comparing the measured pressure to a mathematical model to determine an operational status of the emergency valve.

Preferably, the method further comprises partially stroking the emergency valve in an iterative manner, wherein each of the partial strokes comprises a different measured energy threshold value.

According to another aspect of the invention, a method for determining the operational status of an emergency valve apparatus, movable between a first position and second position, comprises the steps of:

measuring a pressure acting on the apparatus during a partial stroke test; and comparing the pressure acting on the apparatus during the partial stroke test to a mathematical model.

Preferably, the mathematical model is based on a non-operational apparatus.

Preferably, the mathematical model is based on an apparatus having a fixed volume during the partial stroke test.

Preferably, the method further comprises the step of using the equation:

$$P = ae^{-bt}$$ as the mathematical model.

Preferably, the method further comprises the step of determining the emergency valve is operational if the pressure acting on the apparatus during the partial stoke test varies from the mathematical model by more than a threshold difference.

According to another aspect of the invention, a method for partially stroking an emergency shut down system, said emergency shut down system comprises:

an emergency valve apparatus comprising an actuator and a valve, adapted to control fluid flow in a pipeline and being movable between a first position and a second, the apparatus being biased towards the second position;

a solenoid valve that, when energized, provides a fluid flow path between a pressurized fluid supply and the apparatus, thus allowing a pressurized fluid to act on the apparatus thereby moving the apparatus to the first position, and when de-energized, closes the fluid flow path between the pressurized fluid supply and the apparatus and opens a fluid flow path between the apparatus and a pressure release vent to release the pressurized fluid acting on the apparatus; and a pressure sensor adapted to measure a pressure acting on the apparatus;

said method comprises the steps of:

de-energizing the solenoid valve;

measuring the pressure acting on the apparatus as the pressurized fluid acting on the apparatus is released;

re-energizing the solenoid valve to re-open the fluid flow path between the pressurized fluid supply and the apparatus and to close the fluid flow path between the apparatus and the vent; and comparing the measured pressure to a mathematical model.

Preferably, the apparatus moves from the first position towards the second position as the pressurized fluid acting on the apparatus is released.

Preferably, the method further comprises the step of re-energizing the solenoid valve when the measured pressure reaches a threshold pressure.

Preferably, the threshold pressure is chosen such that the fluid flow path between the pressurized fluid supply and the apparatus opens prior to the apparatus reaching the second position.

Preferably, the step of comparing the measured pressure to a mathematical model comprises the step comparing the measured pressure to a mathematical model based on an apparatus having a fixed volume.

Preferably, the step of comparing the measured pressure to a mathematical model comprises the step of comparing the measured pressure to the equation:

$$P=ae^{-bt}.$$

Preferably, the method further comprises the step of determining the emergency valve is operational if the measured pressure varies from the mathematical model by more than a threshold difference.

According to another aspect of the invention, an emergency valve, comprises:

a valve apparatus including a pipeline valve and an actuator, the apparatus being movable between a first position and a second position;

a solenoid valve adapted to provide a fluid flow path between a pressurized fluid supply and the apparatus when energized, and adapted to provide a fluid flow path between the apparatus and a pressure release vent when de-energized;

a sensor adapted to measure a parameter of a fluid acting on the apparatus;

a control means provided to selectively provide the solenoid with a solenoid electrical supply; and a testing means for initiating a partial stroke of the pipeline valve by removing the solenoid electrical supply from the solenoid valve, thereby de-energizing the solenoid valve and re-energizing the solenoid valve when the measured parameter of the fluid acting on the actuator reaches a threshold value.

Preferably, the measured parameter comprises a fluid pressure.

Preferably, the testing means is further configured to compare the measured fluid pressure to a mathematical model to determine an operational status of the pipeline valve.

Preferably, the mathematical model is based on an apparatus having a fixed volume.

Preferably, the mathematical model comprises the equation:

$$P=ae^{-bt}.$$

Preferably, the threshold value comprises a pressure above atmospheric pressure.

Preferably, the measured parameter comprises a flow rate of fluid exhausted from the apparatus.

Preferably, the measured parameter comprises a flow rate of fluid provided to the apparatus.

Preferably, the apparatus further comprises a biasing means adapted to bias the apparatus towards the first position.

Preferably, the pressurized fluid supply is capable of providing a pressure sufficient to overcome the biasing means and retain the apparatus at the first position.

Preferably, the apparatus moves from the first position towards the second position after the solenoid valve is de-energized.

Preferably, the predetermined pressure at which the solenoid valve is re-energized is chosen such that the apparatus does not reach the second position during the partial stroke of the emergency valve.

Preferably, the testing means initiates the partial stroke of the pipeline valve in an iterative manner, and wherein each of the partial strokes comprises a different measured fluid parameter threshold value.

BRIEF DESCRIPTION OF THE DRAWINGS

An example of the invention will now be described by referring to the accompanying drawings.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
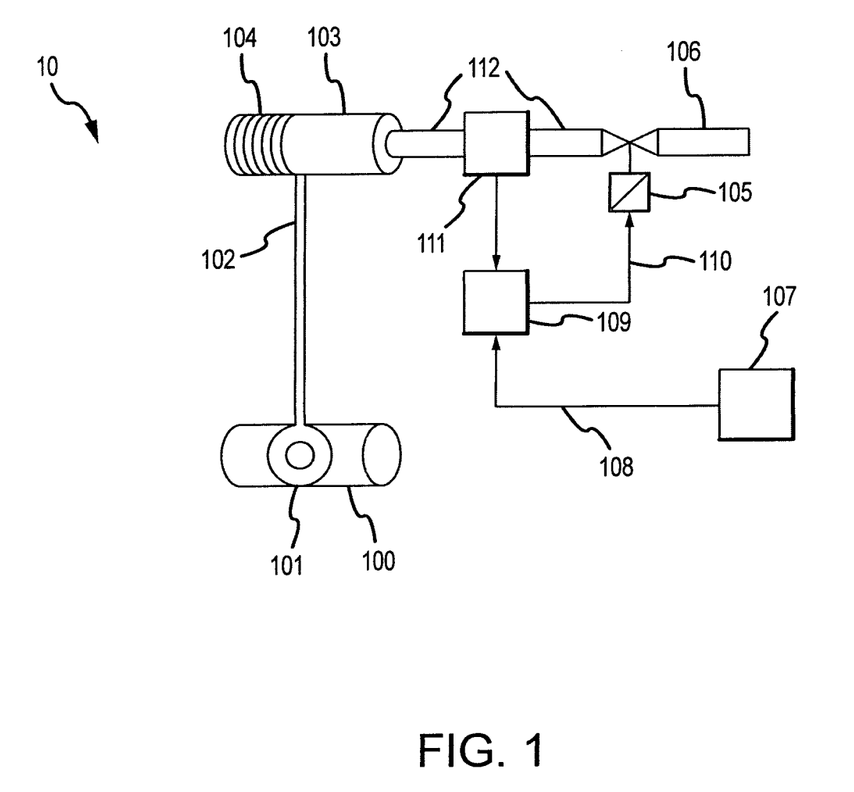
FIG. 1 is a diagrammatic view of an emergency shut down system consisting of a fluid operated valve controlled by an actuator with a pressure transducer utilized to test the operational integrity of the system.

FIG. 1 is a diagrammatic view of an example embodiment of the invention within an emergency shut down system 10 consisting of a fluid operated valve apparatus. The fluid may comprise a pneumatic fluid supply, a hydraulic fluid supply or any other suitable fluid. The valve apparatus comprises a pipeline valve 101 and an actuator 103. The emergency shut down system 10 comprises a pipeline 100, a pipeline valve 101, an emergency valve to actuator linkage 102, an actuator 103, an actuator return spring 104, a solenoid valve 105, a control fluid supply 106, a control means 107, an electrical supply 108, a testing means 109, a solenoid electrical supply 110, a sensor 111, and a control fluid conduit 112.

The emergency shut down system 10 is provided to close the fluid pathway of pipeline 100, using the pipeline valve 101, in the event of a hazard being detected. Alternatively, the emergency shut down system 10 may operate to open the pipeline valve 101 thereby creating a bypass through pipeline 100. It should be understood that while the description that follows relates to emergency valves, such as pipeline valve 101, the present invention is equally applicable to the testing of other types of valves. Likewise, while the discussion below is directed towards normally open valves, the present invention is equally applicable to normally closed valves.

Under normal operation, with no potential hazard identified, the control means 107 would provide the electrical supply 108 to the testing means 109 which in turn would provide the solenoid electrical supply 110 to the solenoid valve 105. According to another embodiment of the invention, the testing means 109 may be included in the control means 107 and thus, the control means 107 would provide the solenoid electrical supply 110 to the solenoid valve 105. The control means 107 may comprise a processor unit, a CPU, a user interface, etc.

According to an embodiment of the invention, as the solenoid valve 105 is in its energized state it provides fluid flow between the control fluid supply 106 and the actuator 103 through the fluid conduit 112. The solenoid valve 105 also includes a pressure release vent. When the solenoid valve 105 is energized, fluid communication between the valve apparatus and the pressure release vent of the solenoid valve is closed. According to one embodiment of the invention, the fluid communication with the valve apparatus is to the actuator 103 and the pressure release vent of the solenoid valve 105 is closed. However, in embodiments where the actuator 103 is not present, the fluid communication may be directly with the pipeline valve 101. The discussion below is limited to the embodiment where fluid is in communication with the actuator 103 solely for the purpose of clarity. Sufficient pressurization of the actuator 103 overcomes the friction of the actuator 103 and the return spring 104 and causes the emergency valve to actuator linkage 102, which in turn moves the pipeline valve 101 within the pipeline 100 to a first position. According to one embodiment of the invention, the second position of the pipeline valve 101 prevents fluid flow through the pipeline 100. According to another embodiment of the invention, the second position of the pipeline valve 101 allows fluid flow through the pipeline 100, while the first position prevents fluid flow through the pipeline 100.

Under conditions where it is desirable to shut down the system 10, the control means 107 can remove electrical supply 108 to the testing means 109 which consequently removes solenoid electrical supply 110 to the solenoid valve 105. As the solenoid valve 105 is in its de-energized state, fluid flow between the control fluid supply 106 and the actuator 103 is prevented, and fluid flow between the actuator 103 and the pressure release vent of the solenoid valve 105 is open. Once the actuator 103 is no longer pressurized, the spring 104 overcomes the friction of the actuator 103 and is allowed to extend. This causes the emergency valve to actuator linkage 102 to move the emergency valve from the first position to the second position within the pipeline 100.

According to an embodiment of the invention, the control means 107 can send a signal to the test means 109 to initiate a partial stroke test of the emergency shut down system 10. A partial stroke test follows the operation outlined above; however, the solenoid 105 is re-energized prior to the closing of the pipeline valve 101 within the pipeline 100. Because the pipeline valve 101 does not fully close the fluid flow through the pipeline 100, there must be some alternative method of determining whether the pipeline valve 101 is operational. Furthermore, it is undesirable to have full closure of the pipeline valve 101 during a partial stroke test as full closure can seriously affect the pipeline operation. Therefore, the partial stroke test must end prior to full closure. In the prior art, the partial stroke test would end after a predetermined amount of time or alternatively, based on a valve position as determined by limit switches. However, because various parameters of the fluid acting on the apparatus are already measured, according to an embodiment of the invention, the partial stroke test may be controlled based on a measured parameter of the fluid. For example, when the measured parameter reaches a threshold value, the solenoid 105 may be re-energized. The measured parameter may comprise, for example, a pressure, a flow rate, or a combination thereof of the fluid acting on the valve apparatus. Once the measured parameter reaches a threshold value, the partial stroke test ends and the solenoid 105 is re-energized.

Furthermore, in many situations, it is desirable to conduct the partial stroke test at the normal operating speed rather than at a reduced speed as seen in the prior art. The valve may not operate as intended at reduced speed and therefore the test could give insufficient results. Therefore, according to an embodiment of the invention, the partial stroke test is performed at normal operating speed. However, there may be situations where it is desirable to perform the test at a reduced speed and therefore, according to another embodiment of the invention, the partial stroke test is performed at a reduced operating speed.

According to another embodiment of the invention, a flow rate of the pressurized fluid flowing either to or from the apparatus, and specifically, the actuator 103 can be measured. If the flow rate reaches a threshold value, the testing means 109 can end the partial stroke test. According to yet another embodiment of the invention, the testing means 109 may measure the energy acting on the solenoid 105. If the energy acting on the solenoid 105 reaches a threshold level, the testing means 109 can end the partial stroke test. The present invention provides a method for determining the operational status of a pipeline valve 101. It should be understood that in some embodiments the measured energy acting on the solenoid 105 comprises a current or a voltage decay. This could be the case where energy is supplied to the solenoid 105 to keep the pipeline valve 101 open and thus, energy is removed from the solenoid 105 during the partial stroke test. However, in other embodiment, energy is not normally supplied to the solenoid 105, but rather, energy is supplied to the solenoid 105 during the partial stroke test. In this embodiment, the energy acting on the solenoid 105 would comprise a current or a voltage supply rather than an energy decay.

According to an embodiment of the invention, the control means 107 initiates a partial stroke emergency valve test.

Unlike the prior art, which compares test results to prior data obtained at an earlier time, the present invention does not require prior tests or previously obtained data to verify the operational status of the pipeline valve 101.

Figure 2:
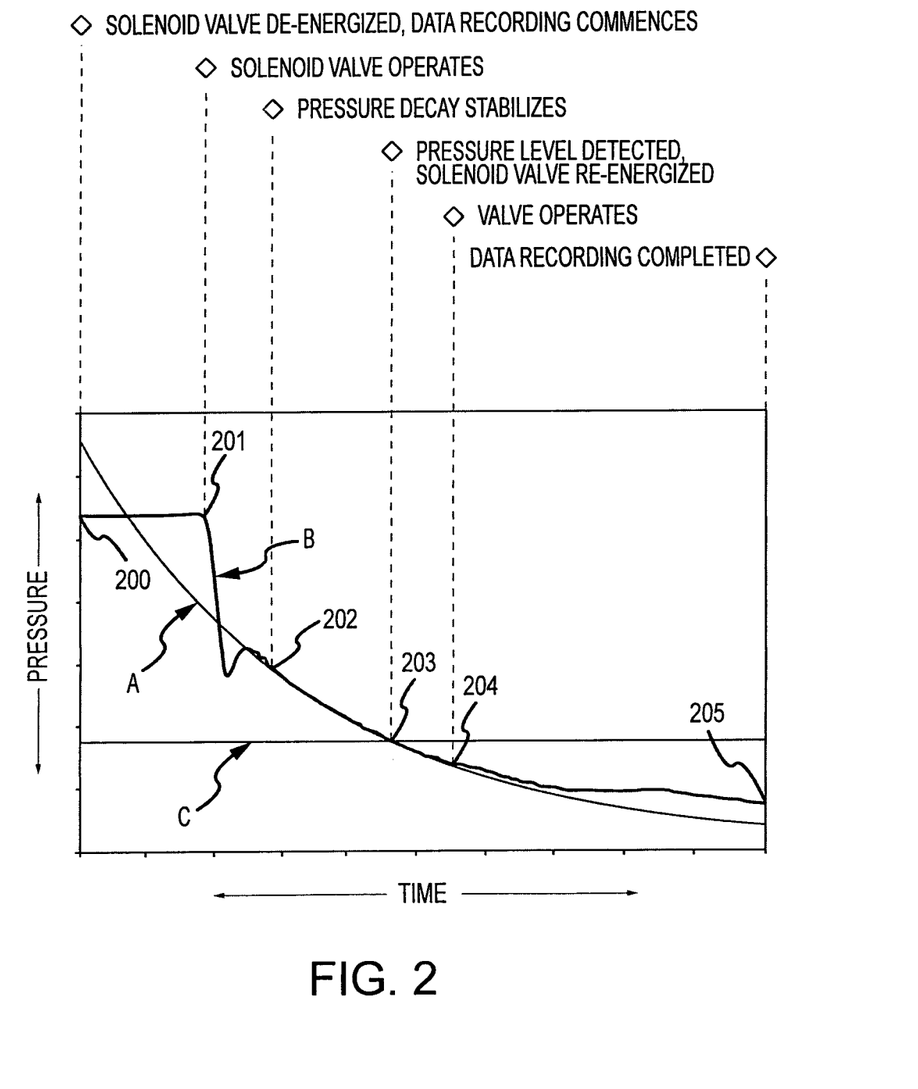
FIG. 2 is a graph of typical pressure measurements made from the system depicted with FIG. 1 against time, together with the key events within the automated test timeline.

FIG. 2 is a graph of typical pressure measurements made from the system 10 depicted with FIG. 1 against time of an example embodiment of the invention within an emergency shut down system 10. As described below, the test means 109 can compare the pressure measurements made from the emergency shut down system 10 to a mathematical model, such as trace A. Trace A shows a trace of the expected pressure measured by a pressure sensor 111 within the fluid conduit 112 if the valve apparatus was seized. If the actuator 103 is seized, then the spring 104 does not move upon the loss of pressure from the system. Therefore, the actuator 103 can be characterized as having a fixed volume. The pressure decay of this fixed volume system can be characterized as a mathematical model, such as:

$$P=ae^{-bt} \tag{1}$$

where:
P=Pressure
a=constant for the system
e=base of the natural logarithm
b=time constant
t=time It should be understood that the equation provided above is merely one mathematical model, and other mathematical models may be used. Furthermore, other forms of mathematical analysis may be performed with the data obtained from the pressure reading. For example, according to an embodiment of the invention, the partial stroke test is performed in an iterative manner (multiple tests in a series). According to this embodiment, the measured fluid parameter obtained from each test can be compared to one another. According to another embodiment of the invention, each test can end based on a different threshold value for the measured fluid parameter.

When the actuator 103 is seized, the pressure of the system decays exponentially, this can be seen as trace A. In contrast, trace B shows a trace of the pressure obtained from pressure sensor 111 during a test of the pipeline valve 101 where the valve apparatus is operational. At point 200, the testing means 109 removes the solenoid electrical supply 110 from the solenoid valve 105, thus de-energizing the solenoid valve 105. The power decay that occurs can be measured. According to an embodiment of the invention, if the measured power reaches a threshold level, the control means 107 may end the partial stroke test. Typically, there is a time delay between when the electrical supply 110 is removed from the solenoid valve 105 and when the solenoid valve 105 actually moves. At point 201, the solenoid valve 105 de-energizes, thus closing off the control fluid supply 106 from the actuator 103 and at the same time, allows the pressure acting on the actuator 103 and the pressure in the fluid conduit 112 to de-pressurize to the environment through the pressure release vent in the solenoid valve 105. The de-pressurization of the fluid conduit 112 can be seen at point 201, where the pressure drops. Depending on the precise configuration of the emergency shut down system 10, the sensor 111 may experience a brief period of disturbance, which is shown on FIG. 2 between points 201 and 202. According to an embodiment of the invention, the sensor 111 comprises a pressure sensor. However, according to another embodiment of the invention, the sensor 111 may comprise a flow sensor, which measures the flow of the fluid either being provided or exhausted to/from the apparatus.

After the period of disturbance, the pressure decay stabilizes as shown starting at point 202. Although the pressure is decaying, at point 202, the pressure within the system is still high enough to overcome the force of the spring 104, and thus the actuator 103 has not moved yet. Therefore, the system is characterized as having a fixed volume and the pressure measured by pressure sensor 111 follows the mathematical curve as depicted by trace A. Trace B follows the mathematical model until the spring force of return spring 104 can overcome the friction force of the actuator 103 and the pressure acting on the actuator 103. Once the actuator 103 moves, the pressure within the system no longer has a fixed volume and thus, the pressure measured by pressure sensor 111 departs from trace A. This can be seen at point 204. Departure from trace A is indicative of an operational pipeline valve 101 because the pipeline valve 101 is directly linked to the actuator 103 via the emergency valve to actuator linkage 102. If however, the pressure obtained from the test followed trace A until there was no pressure in the system, then the actuator volume most likely did not change and therefore, the pipeline valve 101 would fail to move from a first position to a second position.

FIG. 2 also shows a trace C along with a point 203, which is where trace B intersects with trace C. Trace C is a threshold value of a measured parameter. The parameter may comprise a threshold pressure or a threshold flow rate. The threshold value may be programmed into test means 109 or may be set by the user. During a test run, the threshold pressure represents the pressure at which the testing means 109 restores the solenoid electrical supply 110 to the solenoid valve 105. As with de-energizing the solenoid valve 105, re-energizing the solenoid valve 105 typically has a time delay between the time where power is supplied and the time at which the solenoid valve 105 actually moves. Therefore, trace C is chosen at a threshold value such that the solenoid valve 105 will have moved prior to the point at which the spring 104 completely overcomes the pressure acting on the actuator 103. By energizing the solenoid valve 105 at the threshold value, the pipeline valve 101 is not allowed to move completely to the second position. Instead, the actuator 103 is only allowed to partially stroke, thus keeping the pipeline valve 101 open and preventing any disturbance in the system 10. After a predetermined period of time, the testing means will discontinue monitoring the pressure within the fluid conduit 112 with the pressure sensor 111, this is point 205. It should be understood that the solenoid valve 105 may be re-energized when the fluid flow rate reaches a threshold value. According to another embodiment, the solenoid valve 105 may be re-energized when the energy acting on the solenoid valve 105 reaches a threshold level.

After the test sequence depicted within FIG. 2 has been completed, the testing means 109 analyzes the pressure measured by the pressure sensor 111 within the fluid conduit 112 that is acting on the actuator 103 during the test sequence to determine data between points 202 and 203. From the data between points 202 and 203 the pressure profile of trace B is expected to match the pressure profile of trace A generated from the mathematical model of equation 1, or similar equation. The data between points 204 and 205 is also analyzed. Starting at point 204, the measured pressure profile of trace B should deviate from the mathematical model represented by trace A. Should the two pressure profiles differ by more than a threshold amount, the valve would be viewed to have operated satisfactorily. If on the other hand, the pressure profiles substantially match, or do not deviate from trace A beyond a threshold amount, the valve would be viewed to have failed to operate and further investigation would be necessary.

It should be understood that the foregoing description can relate to either an emergency shut down system that closes the pipeline 100, or an alternative embodiment to the foregoing description would relate to a bypass emergency shut down systems, that under conditions where it is desirable to shut down the system the valve would open rather than close.

Figure 3:
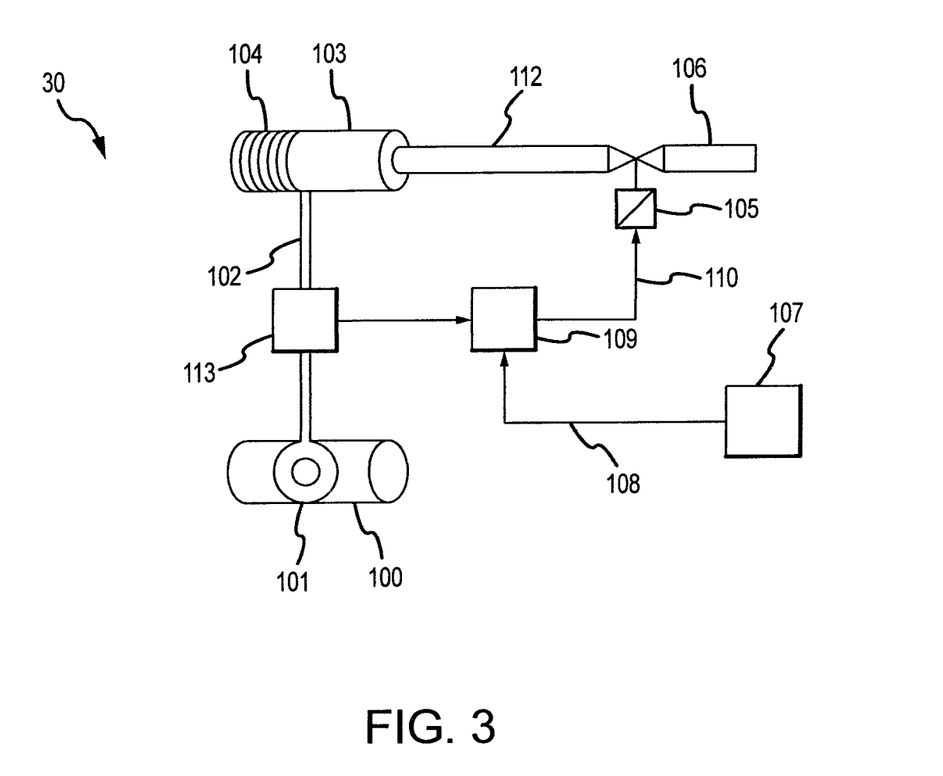
FIG. 3 is a diagrammatic view of an emergency shut down system consisting of a fluid operated valve controlled by an actuator with a position transducer utilized to test the operational integrity of the system.

FIG. 3 shows another alternative embodiment to the foregoing description, which provides a diagrammatic view of an emergency shut down system 30 consisting of a valve apparatus comprising a pipeline valve 101 controlled by an actuator 103 with a position transducer 113 utilized to test the operational integrity of the system 30. Within this alternative embodiment a position transducer 113 is connected to the output of the actuator 103. During the foregoing test sequence the position transducer 113 would be utilized by the testing means 109 to directly determine if the valve 101 would be viewed to have operated satisfactorily.

Figure 4:
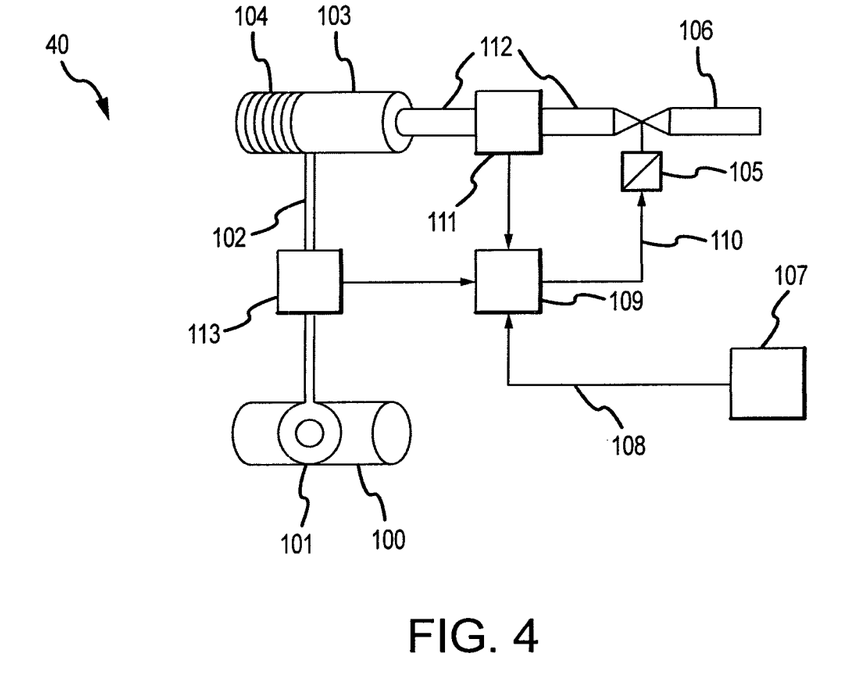
FIG. 4 is a diagrammatic view of an emergency shut down system consisting of a fluid operated valve controlled by an actuator with a pressure transducer and position transducer utilized to test the operational integrity of the system.

FIG. 4 shows another alternative embodiment to the foregoing description, which provides a diagrammatic view of an emergency shut down system 40 consisting of a pneumatically operated valve 101 controlled by an actuator 103 with a pressure transducer 111 and position transducer 113 utilized to test the operational integrity of the system 40. Within this alternative embodiment the combined data from the position transducer 113 and the pressure sensor 111 would be utilized by the testing means 109 to determine if the valve would be viewed to have operated satisfactorily.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valve systems, and not just to the embodiments described above and shown in the accompanying figures. Accordingly, the scope of the invention should be determined from the following claims.

We claim:

1. A method for partially stroking an emergency valve apparatus comprising an actuator and a valve member, the apparatus being movable between a first position and a second position, comprising steps of:
   initiating partial stroke movement of the apparatus from the first position towards the second position;
   measuring a parameter of a fluid acting on the apparatus;
   reversing the partial stroke movement of the apparatus when the measured parameter of the fluid reaches a threshold value; and
   comparing the measured parameter to a mathematical model to determine an operational status of the emergency valve.

2. The method of claim 1, wherein the measured parameter comprises a fluid pressure.

3. The method of claim 2, wherein the threshold pressure comprises a pressure above atmospheric pressure.

4. The method of claim 1, wherein the measured parameter comprises a flow rate of the fluid exhausted from the apparatus.

5. The method of claim 1, wherein the measured parameter comprises a flow rate of the fluid provided to the apparatus.

6. The method of claim 1, further comprising partially stroking the emergency valve in an iterative manner, wherein each of the partial strokes comprises a different measured fluid parameter threshold value.

7. A method for partially stroking an emergency valve apparatus comprising an actuator and a valve member, the apparatus being movable between a first position and a second position, comprising steps of:
   initiating partial stroke movement of the apparatus from the first position towards the second position by adjusting an energy supplied to the apparatus;
   measuring the energy acting on the apparatus;
   reversing the partial stroke movement of the apparatus and the valve when the measured energy reaches a threshold level;
   measuring a pressure of a fluid acting on the apparatus; and
   comparing the measured pressure to a mathematical model to determine an operational status of the emergency valve.

8. The method of claim 7, wherein the step of measuring the energy acting on the apparatus comprises measuring a current.

9. The method of claim 7, wherein the step of measuring the energy acting on the apparatus comprises measuring a voltage.

10. The method of claim 7, further comprising partially stroking the emergency valve in an iterative manner, wherein each of the partial strokes comprises a different measured energy threshold value.

11. A method for determining the operational status of an emergency valve apparatus, movable between a first position and second position, comprising steps of:
   measuring a pressure acting on the apparatus during a partial stroke test; and
   comparing the pressure acting on the apparatus during the partial stroke test to a mathematical model.

12. The method of claim 11, wherein the mathematical model is based on a non-operational apparatus.

13. The method of claim 11, wherein the mathematical model is based on an apparatus having a fixed volume during the partial stroke test.

14. The method of claim 13, further comprising a step of using the equation:

$$P=ae^{-bt} \text{ as the mathematical model}$$

where:
   P=pressure;
   a=constant for the system;
   e=base of the natural logarithm;
   b=time constant; and
   t=time.

15. The method of claim 11, further comprising a step of determining the emergency valve is operational if the pressure acting on the apparatus during the partial stroke test varies from the mathematical model by more than a threshold difference.

16. A method for partially stroking an emergency shutdown system,
   said emergency shutdown system comprising:
      an emergency valve apparatus comprising an actuator and a valve, adapted to control fluid flow in a pipeline and being movable between a first position and a second, the apparatus being biased towards the second position;

a solenoid valve that,
when energized, provides a fluid flow path between a pressurized fluid supply and the apparatus, thus allowing a pressurized fluid to act on the apparatus thereby moving the apparatus to the first position, and when de-energized, closes the fluid flow path between the pressurized fluid supply and the apparatus and opens a fluid flow path between the apparatus and a pressure release vent to release the pressurized fluid acting on the apparatus; and a pressure sensor adapted to measure a pressure acting on the apparatus;

said method comprising steps of:
de-energizing the solenoid valve;
measuring the pressure acting on the apparatus as the pressurized fluid acting on the apparatus is released;
re-energizing the solenoid valve to re-open the fluid flow path between the pressurized fluid supply and the apparatus and to close the fluid flow path between the apparatus and the vent; and
comparing the measured pressure to a mathematical model.

17. The method of claim 16, wherein the apparatus moves from the first position towards the second position as the pressurized fluid acting on the apparatus is released.

18. The method of claim 17, further comprising a step of re-energizing the solenoid valve when the measured pressure reaches a threshold pressure.

19. The method of claim 18, wherein the threshold pressure is chosen such that the fluid flow path between the pressurized fluid supply and the apparatus opens prior to the apparatus reaching the second position.

20. The method of claim 16, wherein the step of comparing the measured pressure to a mathematical model comprises a step comparing the measured pressure to a mathematical model based on an apparatus having a fixed volume.

21. The method of claim 16, wherein the step of comparing the measured pressure to a mathematical model comprises a step of comparing the measured pressure to the equation:

$$P=ae^{-bt}$$

where:
P=pressure;
a=constant for the system;
e=base of the natural logarithm;
b=time constant; and
t=time.

22. The method of claim 16, further comprising a step of determining the emergency valve is operational if the measured pressure varies from the mathematical model by more than a threshold difference.

23. An emergency valve, comprising:
a valve apparatus including a pipeline valve (101) and an actuator (103), the apparatus being movable between a first position and a second position;
a solenoid valve (105) adapted to provide a fluid flow path between a pressurized fluid supply (106) and the apparatus when energized, and adapted to provide a fluid flow path between the apparatus and a pressure release vent when de-energized;
a sensor (111) adapted to measure a parameter of a fluid acting on the apparatus;
a control means (107) provided to selectively provide the solenoid (105) with a solenoid electrical supply (110);
a testing means (109) for initiating a partial stroke of the pipeline valve (101) by removing the solenoid electrical supply (110) from the solenoid valve (105), thereby de-energizing the solenoid valve (105) and re-energizing the solenoid valve (105) when the measured parameter of the fluid acting on the actuator reaches a threshold value; and
wherein the testing means (109) is further configured to compare the measured fluid parameter to a mathematical model to determine an operational status of the pipeline valve (101).

24. The emergency valve of claim 23, wherein the measured parameter comprises a fluid pressure.

25. The emergency valve of claim 23, wherein the mathematical model is based on an apparatus having a fixed volume.

26. The emergency valve of claim 23, wherein the mathematical model comprises the equation:

$$P=ae^{-bt}$$

where:
P=pressure;
a=constant for the system;
e=base of the natural logarithm;
b=time constant; and
t=time.

27. The emergency valve of claim 23, wherein the threshold value comprises a pressure above atmospheric pressure.

28. The emergency valve of claim 24, wherein the measured parameter comprises a flow rate of fluid exhausted from or provided to the apparatus.

29. The emergency valve of claim 24, wherein the measured parameter comprises a flow rate of fluid provided to the apparatus.

30. The emergency valve of claim 24, wherein the apparatus further comprises a biasing means (104) adapted to bias the apparatus towards the first position.

31. The emergency valve of claim 24, wherein the pressurized fluid supply (106) is capable of providing a pressure sufficient to overcome a biasing means (104) and retain the apparatus at the first position.

32. The emergency valve of claim 24, wherein the apparatus moves from the first position towards the second position after the solenoid valve (105) is de-energized.

33. The emergency valve of claim 24, wherein the fluid pressure at which the solenoid valve (105) is re-energized is chosen such that the apparatus does not reach the second position during the partial stroke of the emergency valve.

34. The emergency valve of claim 24, wherein the testing means (109) initiates the partial stroke of the pipeline valve (101) in an iterative manner, and wherein each of the partial strokes comprises a different measured fluid parameter threshold value.

* * * * *